(12) United States Patent
Goff

(10) Patent No.: US 6,945,354 B2
(45) Date of Patent: Sep. 20, 2005

(54) AIRCRAFT HANDLER

(75) Inventor: Barry Ian Goff, Milton Keynes (GB)

(73) Assignee: Douglas Equipment, LTD, Cheltenham (GB)

(*) Notice: Subject to any disclaimer, the term of this patent is extended or adjusted under 35 U.S.C. 154(b) by 24 days.

(21) Appl. No.: 10/442,572

(22) Filed: May 21, 2003

(65) Prior Publication Data
US 2004/0074677 A1 Apr. 22, 2004

(30) Foreign Application Priority Data
Jul. 23, 2002 (GB) .............................. 0217028

(51) Int. Cl.$^7$ ................................ B60D 7/00
(52) U.S. Cl. ..................... 180/904; 414/429; 244/50
(58) Field of Search ............... 180/904, 14.1; 414/427–429; 244/50; 254/2 R

(56) References Cited
U.S. PATENT DOCUMENTS 3,049,253 A * 8/1962 Cabral ....................... 180/904
5,013,205 A * 5/1991 Schardt ...................... 180/14.1
5,860,785 A * 1/1999 Eberspacher ................ 180/904

* cited by examiner

Primary Examiner—Lesley D. Morris
Assistant Examiner—Matthew Luby
(74) Attorney, Agent, or Firm—Paul F. Milliken; Ray L Weber

(57) ABSTRACT

An aircraft handler (10) for use with an undercarriage of an aircraft, the handler being self-propelled and comprising a generally "U" shaped body (11) having arms (12 & 13) linked by a bridge (14) at one end thereof with a pair of drive wheels (16 & 17) located one at the free end of each arm, with at least one wheel(15) located adjacent the bridge(14). A pair of clamping jaws (51) are mounted on the body (11) between the drive wheels (16 & 17) and the bridge (14)and jaws (51) have a lower profile than the arms (12 & 17). The drive wheel (16 & 17) are driven by DC electric motors powered by batteries stored in the arms.

21 Claims, 4 Drawing Sheets

AIRCRAFT HANDLER

FIELD

This invention related to an aircraft handler for use with the nose wheel or tail wheel of an aircraft, particularly but not necessarily helicopters.

BACKGROUND OF THE INVENTION

A conventional aircraft self propelled handler typically has a wheeled rectangular body having a pair of jaws at the front of the body which can clamp against the opposite sides of the front undercarriage wheel or wheels and lift the wheel(s) off the ground. The body carries a large number of electrical batteries that power the handler and provide ballast weight. The body is typically about 500–600 mm in overall height from the ground.

Modern helicopters have fuselages or attachments fixed thereto which are close to the ground and a problem therefore arises in manoeuvring an aircraft handler to engage the nose wheels of such a helicopter without damaging parts of the aircraft or structures attached thereto.

The present invention provides an aircraft handler which is particularly suitable for use with low slung aircraft.

STATEMENTS OF INVENTION

According to the present invention there is an aircraft handler for use with the front undercarriage of an aircraft, the handler being self-propelled and comprising a generally "U" shaped body having a pair of arms linked by a bridge at one end thereof with a pair of drive wheels located one at the free end of each arm, at least one wheel located adjacent the bridge, and a pair of clamping jaws suspended from the body and located between the drive wheels, the bridge being lower than the arms.

The low centre of the body allows the handler to pass under obstructions on the aircraft to clamp the nose wheel(s) for manoeuvring the aircraft.

Preferably, the drive wheels are driven by DC electric motors powered by batteries stored on said arms.

The electric motors are preferably each mounted on a sub-axle assembly coaxially of the respective wheel, and preferably drive the wheels through a gear box also mounted on the wheels.

The sub axle assemblies may be attached to respective circular plates rotatably mounted on the underside of each arm and which have gear teeth on the outer periphery thereof, each plate being turned by a pinion gear which meshes with said teeth and is driven by a motor also mounted on the underside of the respective arm. The plates are rotated to steer the handler.

Alternatively, the handler may be steered by said motors driving the two wheels at different rotational speeds.

The clamping jaws are pivotally mounted to the arms for rotation about a substantially horizontal axis to lower or lift the jaws. This axis is preferably substantially at the centre of gravity of the handler. The jaws may be mounted on a bar extending between the two arms or alternatively on a pair of coaxial stub axles mounted one on each arm. The opposite ends of said bar or stub axles are provided with radial lugs, the jaws being rotationally fixed relative to the respective bar or axles, and actuators acting between a respective arm and lug rotate the bar to move the jaws relative to said arms.

The jaws may be fixed to supports slidably mounted on said bar, and another actuator is operable between said supports to open and close the jaws. The jaws are preferably pivotally mounted relative to said supports by pins arranged normally to the axis of the bar.

In another embodiment the jaws are each fixed to a support pivotally mounted to a respective stub axle and an actuator acts between the ends of the supports to pivot the jaws towards or away from each other.

DESCRIPTION OF THE DRAWINGS

The invention will be described by way of example and with reference to the accompanying drawings in which.

DETAILED DESCRIPTION OF THE INVENTION

Figure 1:
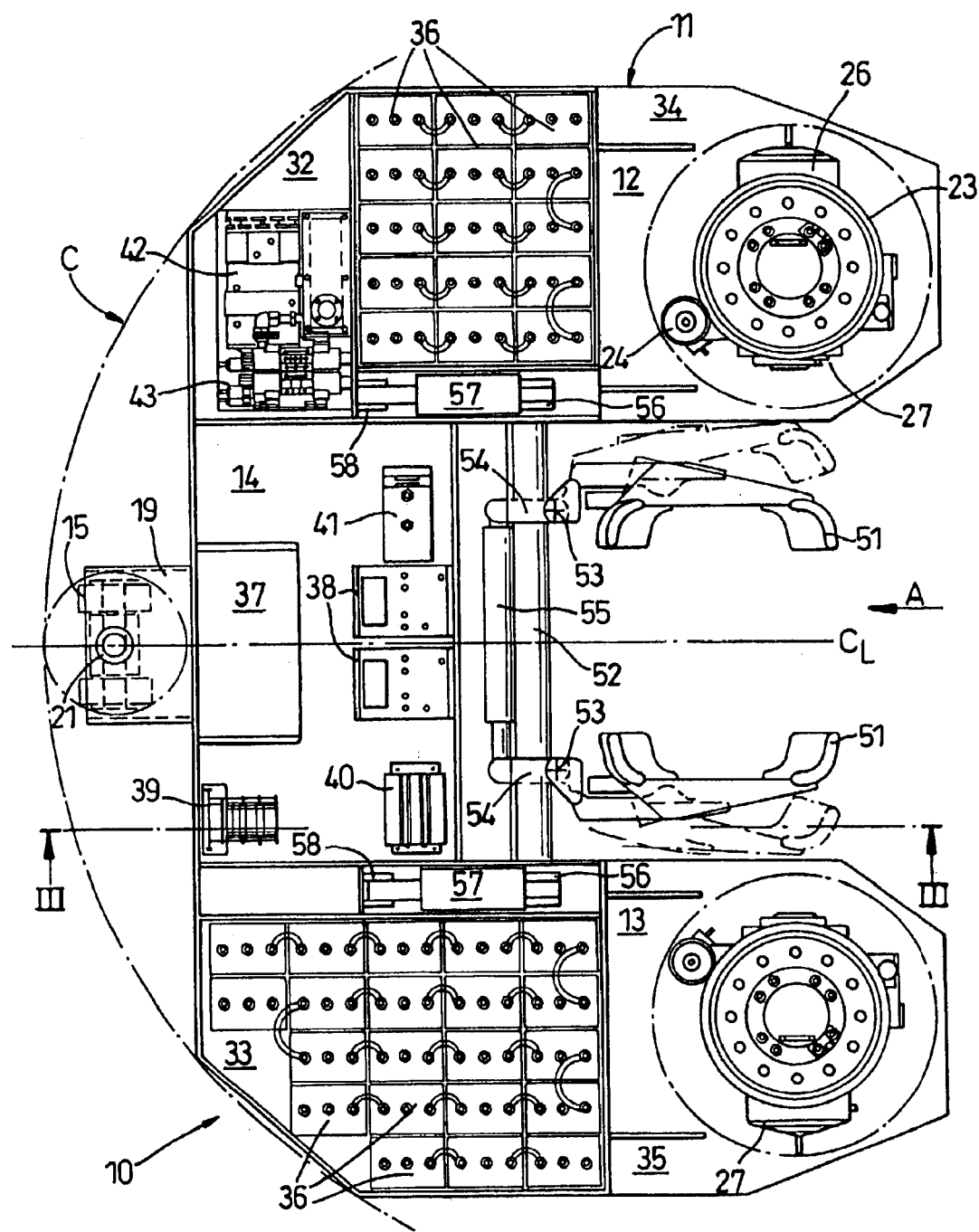
FIG. 1 is a plan view of an aircraft handler according to the present invention.
Figure 2:
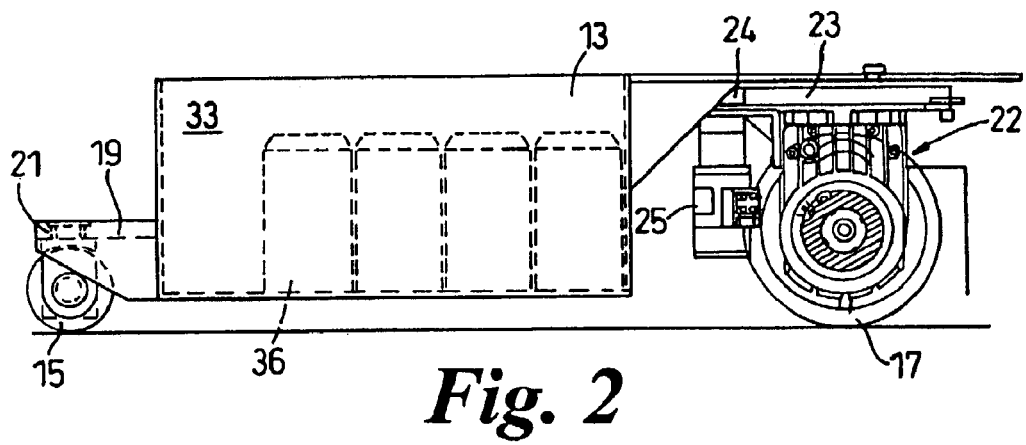
FIG. 2 is a side elevation of the handler of FIG. 1

With reference to the drawings, there is shown an aircraft handler which is for use in co-operation with the front undercarriage of an aircraft, and in particular for use with a helicopter nose wheel. The handler is self-propelled as will be described later.

The handler 10 has a body or chassis 11 which in plan view is substantially "U" shaped or horseshoe shaped having two arms 12 & 13 linked by a bridge 14. The body 10 stands on wheels 15,16 & 17, the wheels 16 & 17 being located at the end portions 34,35 of each respective arm 12 & 13, and wheel(s) 15 being secured to the front of the bridge 14 at its centre line CL. The bridge 14 is lower than the arms 12 & 13 having a height of about 200 mm as compared with the height of the arms which is about 460 mm. The fronts 12 & 13 of the arms are inclined or chamfered so that the inclined portions and the wheels 15 substantially lie on a pitch circle C struck from the intersection of the centre line CL and the axis of rotation of lifting jaws 51.

Each of the arms 12 and 13 is formed from two portions, a respective upwardly facing front compartment 32 or 33, and a raised flat end portion 34 or 35 having a height which is substantially equal to the height of the respective compartment. The front compartments 32, 33 each house a plurality of battery cells 36 which provide power for the handler 10. The bridge 14 is hollow and houses a battery charger 37 for recharging the battery cells 36, a pair of interlinked programmable microprocessor units 38, an isolator 39 for the batteries, a DC/DC converter 40 for supplying power to the microprocessors, and a power contact 41 supplying power to the drive wheels 16 & 17. The front compartment 32 on the arm 12 also houses an electrically powered hydraulic pump 42 and associated control valves 43, the pump 42 being powered by the batteries 36.

The wheel(s) 15 comprise a pair of castor wheels mounted on a forwardly projecting bracket 19 and which can swivel about a vertical pin 21. The drive wheels 16 and 17 are each mounted on a sub-axle assembly 22 which in turn is fixed to a circular plate, or turntable, 23 rotatably mounted under a respective raised end portion 34 or 35 of each arm. The turntables 23 each have gear teeth around their outer periphery which engage a gear wheel 24 mounted on the shaft of a DC electric motor 25 mounted vertically on the sub-axle assembly 22. Each motor 25 rotates its respective turntable 23 to steer its respective wheel 12 or 13 under the control of the microprocessor units 38.

Each sub-axle assembly 22 further comprises an in-wheel drive motor 26 arranged coaxially of the wheel. The drive motor 26 is a DC powered unit driving its respective wheel through a gearbox. Electro-magnetic brake units 27 are also mounted coaxially of the wheels on the respective motors 26. The operation of the drive motors 26 and brakes 27 for movement of the handler is controlled through the microprocessor units 38.

Figure 3:
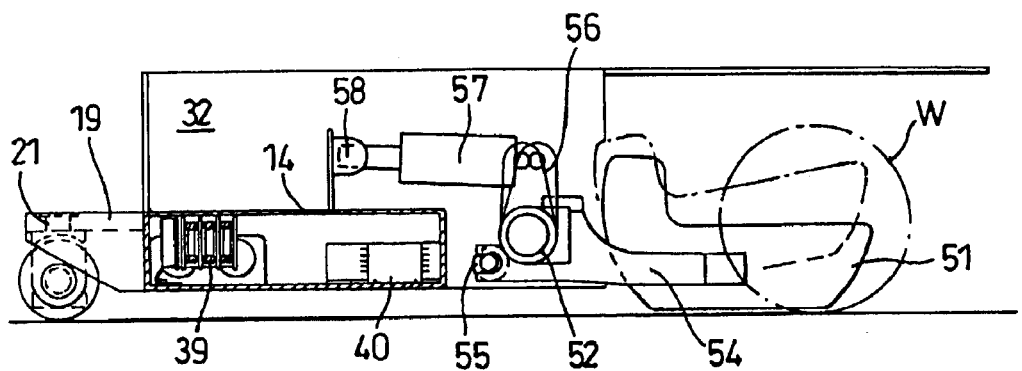
FIG. 3 is a section on the line III—III of FIG. 1.
Figure 4:
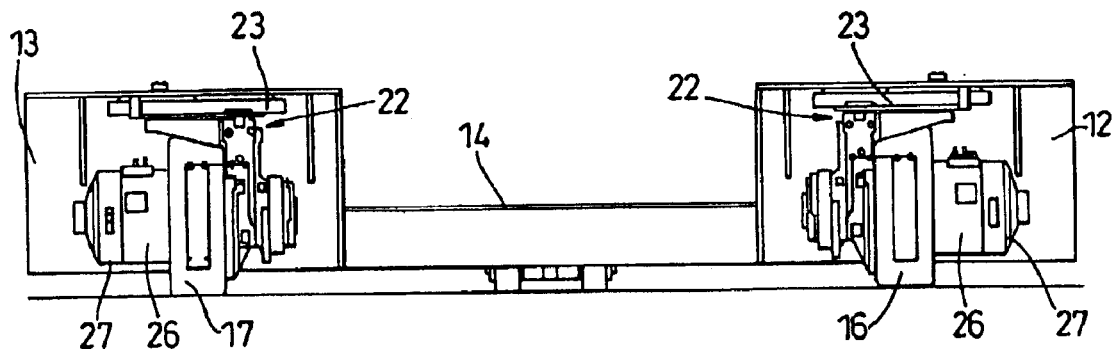
FIG. 4 is a view of the handler in FIG. 1 taken in the direction of arrow A.

A pair of lifting and clamping jaws 51 are located between the arms 12 & 13. The two jaws 51 are internally shaped so that in use they clamp against the sides and tread area of the nose wheel(s) W of an aircraft (see FIG. 3) which are held coaxially within torroidal jaws. The two jaws are lower than the two arms and are mounted on a bar 52 pivotally mounted therebetween. The jaws 51 are each secured by a pivot pin 53 to a support 54 slidably mounted on the bar 52 and rotationally fast therewith. The pins 53 are arranged normally to the axis of rotation of the bar 52 and the jaws 51 are capable of limited rotational movement relative to the bar 52 as indicated in dotted lines in FIG. 1. A hydraulic actuator 55 is connected between lower parts of the two supports 54 and extends parallel to the bar 52. The actuator 55 is operable to move the supports axially along the bar 52 to open and close the jaws 51. The movement of the jaws 51 about the pins 53 allows for the angular mis-alignments of the jaws relative to the wheels to be clamped. The two ends of the bar 52 located within the compartments 32,33 are provided with radial lugs 56 which are rotationally fast with the bar 52. The lugs 56 are connected to a respective hydraulic actuator 57 located within the compartment and extending between the lugs 56 and a bracket 58 on the respective arm 12 or 13. Operation of the two actuators 57 rotates the bar 52 raising or lowering the jaws as shown in dotted outline in FIG. 3.

The hydraulic actuators 55 and 57 are connected by hydraulic hoses (not shown) to the control valves 43 which are in turn operated through the microprocessors 38.

The operation of the handler is controlled by a remote hand set (not shown) which is connected to the microprocessors 38 via an electrical control cable or other suitable means.

In plan view the handler is shaped so that it fall within a circle C struck from the intersection of the centre line CL of the handler and the axis of rotation of the jaws 51 and aircraft wheel(s) W. The radius of the circle C is as small as possible preferably about 1400 mm.

In use, the handler is manoeuvred, by an operator using a remote hand set, under the nose of an aircraft to engage with the front nose wheels and then clamp onto and lift the front nose wheel clear of the ground. The aircraft can then be manoeuvred by the self propelled handler as is required under the control of the operator. Since the centre of the handler is occupied only by the bridge 14 and the jaws 51 and associated mechanism, the centre has a very low profile with the high profile parts being put into the arms 12 & 13. This allows the handler to be used with aircraft having parts and fittings close to the ground. Keeping the handler profile within a small circle C also allows for manoeuvrability whilst under the aircraft.

Figure 5:
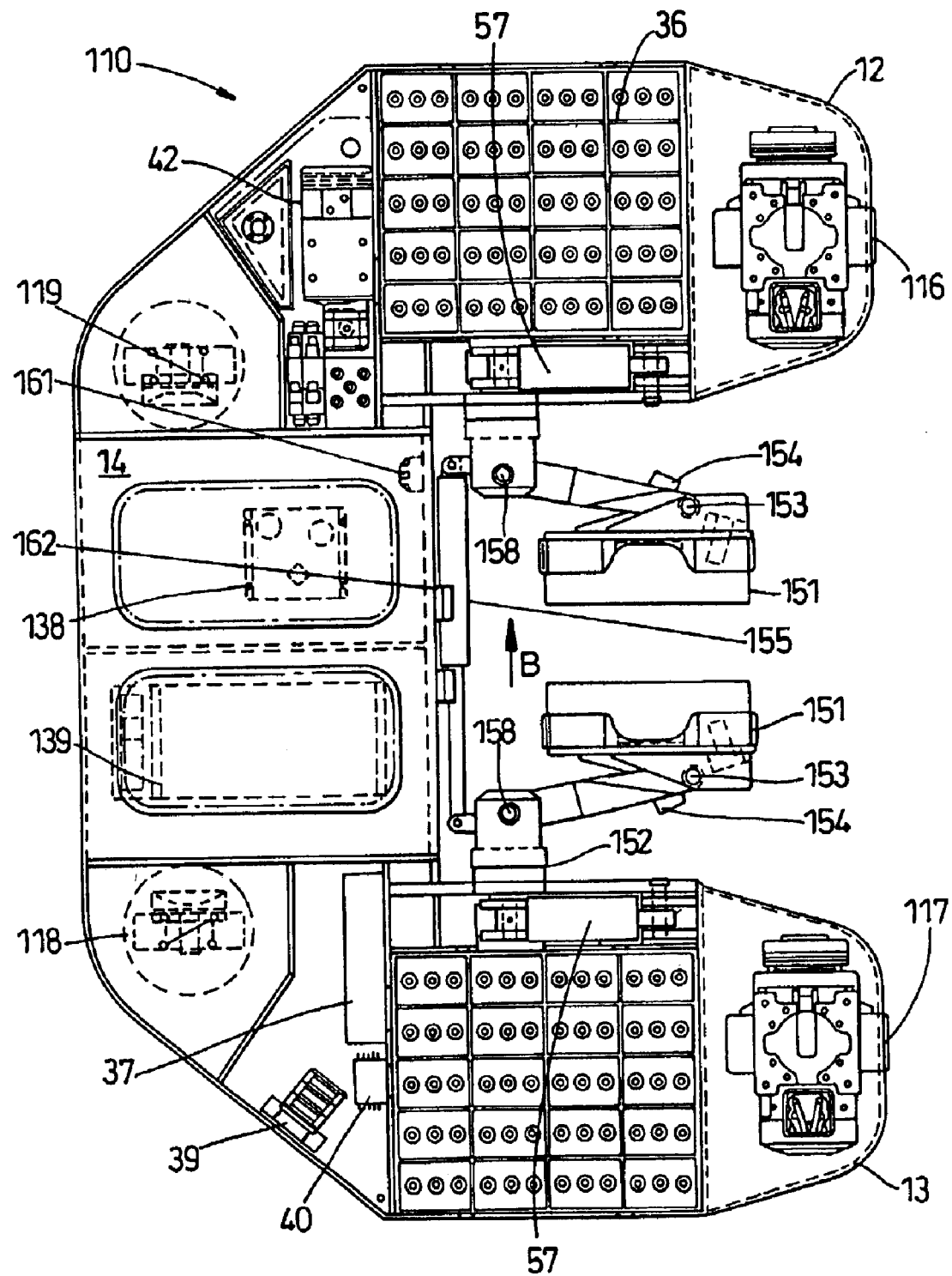
FIG. 5 is a plan view of a second aircraft handler according to the present invention.
Figure 6:
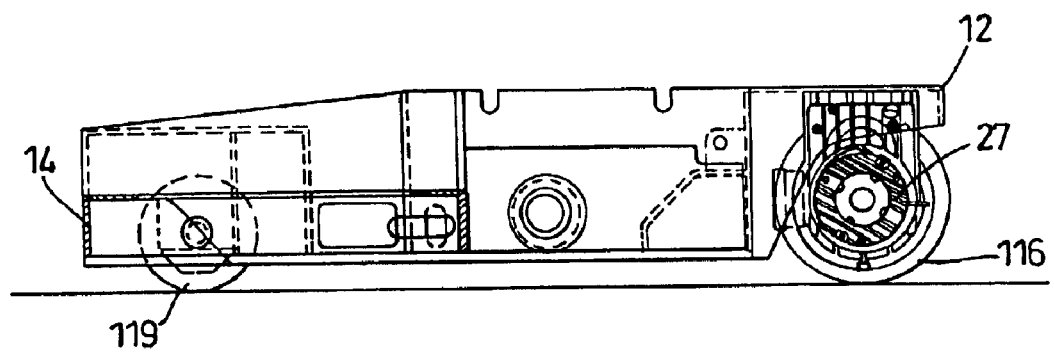
FIG. 6 is a view on the arrow B of the arm shown in FIG. 5.
Figure 7:
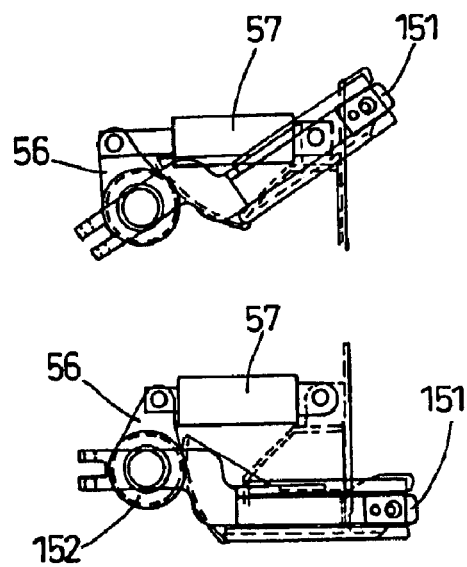
FIG. 7 is a scrap view on the arrow B showing the jaws in raised and lowered positions.

With reference to FIGS. 5 to 7 there is shown a second embodiment of the invention and only those features that differ from the first embodiment will be described in detail. The same reference numbers will be used for components which are similar or identical to components in the first handler 10.

The handler 110 stands on a pair of wheels 116 and 117 located one at the end of each respective arm 12 or 13, and a pair wheels 118 and 119 located one to each side of the bridge 14. The wheel 119 is a swivel castor wheel and the other wheel 118 is steerable wheel mounted on a geared plate for steering in a similar manner to the wheels 16 & 17 for the handler 10. The wheels 116 and 117 are drive wheels driven by in-wheel drive motors 26 as previously described. The wheels 116 & 117 are fixed and the handler may be steered by said motors driving the two wheels at different rotational speeds. Since the handler steers by means of differences in rotational speed between the wheels and without the turntables 23, the heights of the arms 12 and 13 can be further reduced as compared with the first handler 10.

The lifting and clamping jaws 151 are each pivoted by a pin 153 to one end of a support arm 154. Each support arm 154 is in turn pivoted to a stub axle 152 which is mounted for rotation to a respective arm 12 or 13. The two stub axles 152 are coaxial and rotate about a horizontal axis and the two support arms 154 are held rotationally fast in one orthogonal axis in a diametral slot in the inner end of each respective axle 152 and are pivoted in the other orthogonal axis to the respective stub axle 152 by pins 158 normal to the slots. The pins 158 are located inwardly from the other end of the support arm 154 so that an actuator 155 operable between the other ends of the support arms moves the jaws closer or apart.

The ends of the respective stub axles 152 within the compartments 32, 33 are provided with lugs 56 which are connected to a respective hydraulic actuator 57 as previously described for raising and lowering the jaws. The actuator 57 extends to raise the jaws.

The sub axles 152 are located substantially at the centre of gravity of the holder 110.

The steering mechanism for the front wheels 116,117 using differential rotational speeds can be combined with steering system for the wheels 16 & 17 of the first handler.

The holder 110 is also provided with a sound alarm 161 to indicate when the handler is in use and lights 162 for operation of the handler in the dark.

The handler is controlled through a pair of microprocessors 138 and 139 which control the speeds of the drive wheel 116 & 117, the angle of the steerable wheel 118, and the operation of the jaws 151.

What is claim is:

1. An electrically powered self propelled aircraft handler for use with an undercarriage of an aircraft, the handler comprising a generally "U" shaped body having a pair of arms linked by a bridge at one end thereof with a pair of drive wheels located one at the free end of each arm, at least one wheel located adjacent the bridge, and a pair of clamping jaws mounted on the body and located between the drive wheels, the bridge and jaws having a lower profile than the arms, wherein the drive wheels are driven by DC electric motors powered by batteries stored on said arms.

2. A handler as claimed in claim 1 wherein the electric motors are each mounted on a respective wheel sub-axle assembly coaxially with the wheel.

3. A handler as claimed in claim 2 wherein an electro magnetic brake is also located on each said sub-axle assembly coaxially of the wheel.

4. A handler as claimed in claim 2, wherein the sub-axle assemblies are each attached to respective circular plate rotatably mounted on the underside of each arm, each plate having gear teeth on the outer periphery thereof which mesh with teeth on a gear driven by a motor also mounted on the underside of the respective arm, the handler being steered by rotation of said plates.

5. A handler as claimed in claim 2, wherein the handler is steered by said motors driving the two wheels at different rotational speeds.

6. A handler as claimed in claim 4, wherein there are two wheels located adjacent the bridge, one being a castor wheel, the other wheel being steerable to facilitate operation of the handler.

7. A handler as claimed in claim 5, wherein there are two wheels located adjacent the bridge one being a castor wheel, the other wheel being steerable to facilitate operation of the handler.

8. A handler as claimed in claim 1, wherein the clamping jaws are rotatably mounted between the two arms for rotation about a substantially horizontal axis to lift said jaws.

9. A handler as claimed in claim 8, wherein the two jaws are mounted on a bar extending between the two arms.

10. A handler as claimed in claim 8 wherein the two jaws are each mounted on a stub axle, the two stub axles being coaxially mounted on the two arms.

11. A handler as claimed in claim 9, wherein the outer end of said bar are provided with radial lugs and the jaws are rotationally fixed relative to the bar about its axis, and actuators acting between a respective arm and lug rotate the bar to lift or lower the jaws relative to said arms.

12. A handler as claimed in claim 11, wherein the jaws are fixed to supports slidably mounted on said bar, and an actuator is operable between said supports to open and close the jaws.

13. A handler as claimed in claim 12, wherein the jaws are pivotally mounted relative to said supports by pins arranged normally to the axis of the bar.

14. A handler as claimed in claim 10, wherein the outer ends of said stub axles are provided with radial lugs and the jaws are rotationally fixed relative to the axles about said axis, and actuators, acting between a respective arm and lug rotate the stub axles to lift or lower the jaws relative to said arms.

15. A handler as claimed in claim 10, wherein the lifting and clamping jaws are each pivoted by a pin to one end of a support arm which in turn pivoted to a respective stub axle.

16. A handler as claimed in claim 13, wherein the lifting and clamping jaws are each pivoted by a pin to one end of a support arm which in turn pivoted to a respective stub axis.

17. A handler as claimed in claim 10 wherein the two support arms are each held rotationally fast in one orthogonal axis in a diametral slot in the inner end of each respective stub axle and are pivoted in the other orthogonal axis to the respective stub axle by a pin normal to the respective slot, said pin being located inwardly from the other end of the support arm so that an actuator operable between the other ends of the support arms moves the jaws closer or apart.

18. A holder as claimed in claim 8 wherein said horizontal axis of rotation is located substantially at the centre of gravity of the handler.

19. A handler as claimed in claim 1, wherein front portions of the arms are shaped to substantially lie on a pitch circle struck from the intersection of the handler centre line and the axis of rotation of the jaws.

20. An electrically powered self propelled aircraft handler for use with an undercarriage of an aircraft, the handler comprising a generally "U" shaped body having a pair of arms linked by a bridge at one end thereof with a pair of drive wheels driven by electric motors and located one at the free end of each arm, at least one wheel located adjacent the bridge, a pair of clamping jaws mounted on the body and located between the drive wheels, the bridge and jaws having a lower profile than the arms, the handler being operably controlled by microprocessor means in turn controlled by a remote handset utilised by an operator.

21. A low profile electrically powered aircraft handler for use with an undercarriage of an aircraft, the handler being self-propelled and comprising a generally "U" shaped body having a pair of arms linked by a bridge at one end thereof with a pair of drive wheels located one at the free end of each arm, at least one wheel located adjacent the bridge, and a pair of clamping jaws mounted on the body and located between the drive wheels, the bridge and jaws having a lower profile than the arms, wherein the drive wheels are driven by electric motors powered by batteries stored on said arms.

* * * * *